United States Patent

[11] 3,607,802

[72] Inventor Kazys Sekmakas
　　　　　　　Chicago, Ill.
[21] Appl. No. 779,604
[22] Filed Nov. 27, 1968
[45] Patented Sept. 21, 1971
[73] Assignee DeSoto, Inc.
　　　　　　　Des Plaines, Ill.

[54] METHYLOLATED ACRYLAMIDE INTERPOLYMERS CONTAINING ISOBUTYL ACRYLATE AND HYDROXY POLYESTERS
9 Claims, No Drawings

[52] U.S. Cl.......................................... 260/21,
　　117/132 B, 117/132 BF, 117/161 K, 117/161 LN,
　　260/22 CB, 260/31.2 N, 260/31.2 XA, 260/32.8
　　N, 260/33.2 R, 260/33.4 R, 260/33.6 UA, 260/39
　　R, 260/40 R, 260/850, 260/851, 260/870, 260/872
[51] Int. Cl.......................................... C08g 51/72,
　　C08g 17/16, C08g 37/34
[50] Field of Search.................................. 260/850,
　　21, 22 RU, 870, 872

[56] References Cited
UNITED STATES PATENTS

| | | | |
|---|---|---|---|
| 3,163,615 | 12/1964 | Sekmakas..................... | 260/21 |
| 3,257,475 | 6/1966 | Sekmakas..................... | 260/850 |
| 3,278,638 | 10/1966 | Sekmakas..................... | 260/850 |
| 3,368,988 | 2/1968 | Sekmakas..................... | 260/850 |
| 3,368,999 | 2/1968 | Sekmakas et al............. | 260/850 |

*Primary Examiner*—John C. Bleutge
*Attorney*—Dressler, Goldsmith, Clement & Gordon

ABSTRACT: Organic solvent-soluble thermosetting acrylic interpolymers uniquely adapted for coil coating application are provided by interpolymerizing from 6%–15% acrylamide or methacrylamide with from 10%–35% of polyethylenically unsaturated polyester having an hydroxy value of 150–350, from 30%–60% of isobutyl acrylate, from 10%–22% of styrene or vinyl toluene, and from 2%–15% methyl methacrylate. The amide component is methylolated and the interpolymer is provided with an acid number of from 3–20 in order to provide a rapid curing system which will have the gloss, flexibility, hardness and solvent resistance required for coil coating application and which will, nonetheless, provide superior flow and wetting characteristics.

METHYLOLATED ACRYLAMIDE INTERPOLYMERS CONTAINING ISOBUTYL ACRYLATE AND HYDROXY POLYESTERS

The present invention relates to alkylolated acrylamide interpolymers which are uniquely adapted to provide a combination of inconsistent properties which have not hitherto been available in such a system.

Alkylolated acrylamide-containing thermosetting acrylic interpolymers have achieved considerable acceptance in the field of coil coating where hard coatings of extreme flexibility are required. Unfortunately, the wetting and flow characteristics of these coatings is quite poor.

Efforts have been made to vary the selection of materials and proportions in order to improve the wetting and flow properties and also to increase the gloss and image reflectance of the coating, but despite prolonged efforts in this regard, little has been accomplished. Whenever a particular formulation tended to provide better wetting and flow properties, then the composition tended to crater or to be too soft and too sensitive to organic solvent attack. In addition, the flexibility and impact resistance of the product as well as its hardness and solvent resistance have to be very carefully balanced, otherwise the products tend to be deficient either from the standpoint of being brittle or having poor exterior durability or by being inadequately cured.

In accordance with the present invention, it has been found that a maximum of at least five specific components are required with the selection and proportion of each component being critical in order to provide an alkylolated acrylamide interpolymer which will cure to form adequately hard and flexible coatings and which will also provide good plate wetting and flow characteristics as well as the gloss and image reflectance which are needed for superior coil coatings.

First, a very significant cure is needed so that the product will possess adequate hardness and solvent resistance. This requires from 6%–15% of acrylamide or the like, preferably from 9%–13%. Generally speaking, the resin systems of the invention require slightly more of the acrylamide component than would otherwise be needed were it not for the selection of materials to be described hereinafter.

In addition to the proportion of acrylamide, an adequate cure requires from 10%–35%, preferably from 15%–25% of an hydroxy-functional polyester. The hydroxy-functionality of the polyester is strongly reactive with the alkylol functionality provided by the acrylamide component after the same has been reacted with aldehyde in order to provide the vigorous cure which is needed.

The third essential component of the mixture is isobutyl acrylate which, in the specially balanced system of the invention, provides unique properties which cannot be duplicated by the selection of any other vinyl monomer. The isobutyl acrylate component is used in an amount of from 30%–60%, preferably from 40%–55%.

In addition to the isobutyl acrylate, the invention still further requires that styrene or like monomer and methyl methacrylate be used in combination. The styrene is used in an amount of from 10%–22%, and the methyl methacrylate in an amount of from 2%–15%, the total of styrene and methyl methacrylate preferably not exceeding 25%.

In addition to the foregoing, a small amount of unsaturated acid, e.g., from 0.3%–1.5%, preferably from 0.6%–1.0%, may be used, methacrylic acid being a typical acid for this purpose.

All of the percentages referred to herein are by weight, based on the total weight of the resin, unless otherwise indicated.

To provide some concept of the careful balance which is needed in accordance with the invention, the hydroxy polyester and the acrylamide component are both essential in order to provide the extensive cure which is needed. Unless the extensive cure achieved in the invention is obtained, then the hardness and solvent resistance are inadequate and the product will tend to block. On the other hand, if the proportion of acrylamide is excessive, then the flexibility and impact resistance of the product fall off rapidly.

The proportion of styrene is also important since excessive proportions of styrene rapidly lead to brittle products possessing poor exterior durability. On the other hand, if the methyl methacrylate component is increased in proportion, then the solvent resistance falls off and the necessary molecular distribution is not obtained providing brittle products.

The isobutyl acrylate component is indeed unique in providing the wetting, flow properties, image reflectance and gloss which are so essential to a superior composition. Acrylic esters of shorter chain length, such as ethyl acrylate, lead to poor wetting characteristics which is quite detrimental in commerce. The longer chain acrylic esters such as n-butyl acrylate or 2-ethylhexyl acrylate, lead to the production of products which are excessively soft and which possess inadequate solvent resistance.

On the other hand, when all of the selections of materials and proportions are made as aforesaid, the characteristics of the final product are uniquely superior to any which have previously been obtained and innumerable selections of materials and proportions have been made in an effort to best use the alkylolated acrylamide thermosetting acrylic systems in coil coating utility.

From the standpoint of material variation which is permissible in accordance with this invention, the acrylamide component may be replaced by methacrylamide, and styrene may be replaced by vinyl toluene, but the isobutyl acrylate and methacrylate components cannot be altered.

The small amount of unsaturated acid used for internal catalysis is not of prime significance and the methacrylic acid may be replaced by any monoethylenically unsaturated carboxylic acid such as acrylic acid, crotonic acid, maleic acid, monobutyl maleate, and the like. While the selection of the unsaturated acid is of secondary significance and, indeed, the acid can be completely omitted, the interpolymers produced in accordance with the invention should have an acid value of from 3–20, preferably an acid value of 8–15 and the polyester component desirably provides at least a portion of this acid value.

Hydroxy polyesters of the general type which may be used in this invention are polyethylenically unsaturated polyesters and their preparation and nature are more fully described in my prior U.S. Pat. Nos. 3,163,615 issued Dec. 29, 1964; 3,257,475 issued June 21, 1966, and 3,278,638 issued Oct. 11, 1966.

The hydroxy-functional polyester in accordance with the invention should have an hydroxy value of 150–350, preferably between 200–300 and this high hydroxy functionality is essential in order that the methylolated acrylamide functionality may be properly supplemented with hydroxy functionality without employing an excessive proportion of the polyester resin. The fact that the hydroxy functionality is supplied by the polyester resin is also of importance in maintaining the flexibility essential to coil coating application. Thus, if hydroxy-functional monomers are used in any significant amount, the products produced tend to be much too brittle.

The hydroxy-functional polyester is preferably of reasonably high molecular weight for an unsaturated polyester material, it being desirable to employ polyesters which have a viscosity in n-butanol at 80% solids in the range of from T to $Z_2$ measured on the Gardner scale.

While the polyesters used in the invention have their molecular weight primarily as a result of a polyesterification reaction, it is permissible to include some other mechanism to provide a portion of the advance of the polyester to its final viscosity, e.g., a small amount of aliphatic diisocyanate can be used to advance the polyester through a urethane-forming reaction with a portion of the polyester hydroxy.

A particularly preferred hydroxy-functional polyester for use in the invention is prepared as follows, and is referred to hereinafter as "Hydroxy-Functional Polyester Resin A."

Charge into a reactor equipped with an agitator, heating mantle, Dean-Stark trap, thermometer and nitrogen inlet tube, 790 grams of dehydrated castor oil fatty acids, 250 grams of crotonic acid, 785 grams of glycerine and 400 grams of isophthalic acid. Add 50 grams of xylol as reflux solvent. Heat to 420° F. and hold for acid value of 5.0. Cool to 380° F. and add 240 grams of a technical grade of 1,1'-isopropylidenebis (p-phenhyleneoxy) di-2-propanol, 160 grams of phthalic anhydride and 255 grams of azelaic acid. Heat to 420° F. and hold for an acid value of 13–15. Add 510 grams of butyl alcohol to provide a solution containing 80% solids.

The final characteristics of the polyester resin are:

| Solids (percent) | 79.5 |
| Viscosity (Gardner) | V–W |
| Color (Gardner) | 3–4 |

In view of the criticality which exists in the selection of materials and their proportion, the interpolymer should consist essentially of the materials named and cannot include extraneous material in any significant amount for this would alter the unusual balance of physical and chemical properties which is here obtained.

The polymerization which is utilized is a solution polymerization and the acrylamide component is customarily methylolated either simultaneously with copolymerization or subsequently thereto. The copolymerization is preferably conducted in the presence of an alkaline catalyst as is explained more fully in my prior patents listed hereinbefore.

In the light of the reactivity which is needed for the rapid cure which is desired, the amide moiety must be converted to an N-methylol group and this is done by reaction with formaldehyde which is desirably used in an amount of 1–4 equivalents of formaldehyde for each amide group present. The formaldehyde may be used in any form, e.g., in solution in an organic solvent as paraformaldehyde, or in some polymeric form which liberates formaldehyde in situ. The important point is that the amide group is converted to the N-methylol group and such conversion in various ways is well known so that the final polymer includes methylolated acrylamide or methacrylamide.

The particular nature of the organic solvent used for the solution copolymerization or for the solvent solution application of the interpolymers of the invention is not a critical aspect of this invention. Butanol, preferably in admixture with xylol, is a preferred solvent system, but the invention is not limited to specific solvents since many others are available and useful, such as toluene, methyl ethyl ketone, methyl isobutyl ketone, acetone, butyl acetate, 2-ethoxy ethanol, 2-butoxy ethanaol, etc.

The invention is illustrated by the example of preferred operation which follows.

EXAMPLE

| Charge Composition | Grams |
| --- | --- |
| 1. Aromatic hydrocarbon solvent (boiling range 375°–410° F.) | 450 |
| 2. Butanol | 200 |
| 3. Paraformaldehyde | 160 |
| 4. 2-Butoxy ethanol | 100 |

Charge components 1–4 into a reactor equipped with an agitator, thermometer, condenser, nitrogen inlet tube and a Dean-Stark trap and heat to 115° C. under light nitrogen sprage.

| 5. Acrylamide | 200 |
| 6. Butanol | 400 |
| 7. 2-Butyoxy Ethanol | 100 |
| 8. Aromatic hydrocarbon solvent (boiling range 375°–410° F.) | 200 |

In a separate container, dissolve component 5 in components 6, 7 and 8.

| 9. Triethyl Amine | 6 |
| 10. Styrene | 340 |
| 11. Methyl Methacrylate | 60 |
| 12. Isobutyl Acrylate | 980 |
| 13. Glacial Methacrylic Acid | 16 |
| 14. Hydroxy-Functional Polyester Resin A (80% solids) | 500 |
| 15. Ditertiary butyl peroxide | 12 |
| 16. Azobisisobutyronitrile | 14 |
| 17. Cumene hydroperoxide | 7 |

Add components 9 through 17 to the solution of components 5–8 to form a premix which is added to the reactor over a 2½ hour period while maintaining the temperature at 115°–120° C. Hold for two hours at this reaction temperature.

Add 7 grams cumene hydroperoxide and hold for 2 hours.

Add 5 grams tertiary-butyl perbenzoate and hold for 2 hours. Then add 100 grams butanol to provide an interpolymer solution having the following final characteristics:

| Solids (percent) | 55.2 |
| Viscosity (Gardner) | Y–Z |
| Color (Gardner) | 1 |
| Acid Value (nonvolatile) | 8.7 |

The interpolymer of the foregoing example is evaluated as a gloss coil coating enamel as follows. The enamel is prepared using titanium dioxide rutile in a pigment to binder ratio of 1:1, the resin being thinned to 57% solids (viscosity of 28–32 seconds, No. 4 Ford Cup) using an aromatic hydrocarbon solvent having a boiling range of 375°–410° F.

Drawdowns of the enamel are made on aluminum panels to provide a coating thickness of about 1 mil. The coatings are cured in a gas fired oven for 60 seconds at 525° F.

The coatings exhibit excellent flow and wetting characteristics and the films are free of pinholes and craters. The cure used is a minimum bake, but the films cure excellently to resist 50 double rubs with a methyl ethyl ketone-saturated cloth. The cured films exhibit superior gloss (60° glossmeter of 93) and a rich and deep surface. The films have excellent flexibility (pass 30 lbs. reverse impact) despite a pencil hardness of F-H.

The invention is defined in the claims which follow.

I claim:

1. An organic solvent-soluble thermosetting acrylic interpolymer consisting essentially of from 6%–15% acrylamide or methacrylamide, from 10%–35% of hydroxy-functional polyethylenically unsaturated polyester having an hydroxy value of 150–350, from 30%–60% of isobutyl acrylate, from 10%–22½%–15% of styrene or vinyl toluene and from 2–15% of methyl methacrylate, said acrylamide or methacrylamide being methylolated in said interpolymer and said interpolymer having an acid number of from 3–20.

2. An interpolymer as recited in claim 1 in which the total of styrene, vinyl toluene and methyl methacrylate does not exceed 25%.

3. An interpolymer as recited in claim 1 in which said interpolymer includes from 0.3%–1.5% of unsaturated carboxylic acid.

4. An interpolymer as recited in claim 1 in which said interpolymer includes from 9%–13% of acrylamide or methacrylamide and from 15%–25% of said hydroxy-functional polyester.

5. An interpolymer as recited in claim 4 in which said interpolymer includes from 40%–55% of isobutyl acrylate.

6. An interpolymer as recited in claim 5 in which said interpolymer includes from 0.6%–1.0% of unsaturated carboxylic acid and has an acid number of from 8–15.

7. An interpolymer as recited in claim 6 in which said hydroxy-functional polyester has an hydroxy value of 200–300.

8. An interpolymer as recited in claim 1 in which said hydroxy-functional polyester has a viscosity in n-butanol at 80% solids in the range of T to $Z_2$ measured on the Gardner scale.

9. A thermosetting organic solvent solution coil coating composition comprising organic solvent having dissolved therein the interpolymer of claim 1.

PO-1050
(5/69)

UNITED STATES PATENT OFFICE
CERTIFICATE OF CORRECTION

Patent No. 3,607,802          Dated September 21, 1971

Inventor(s) Kazys Sekmakas

It is certified that error appears in the above-identified patent and that said Letters Patent are hereby corrected as shown below:

Column 3, line 4, "p-phenhyleneoxy" should be -- p-phenyleneoxy --
Column 3, line 50, "ethanaol" should be --ethanol--
Column 4, claim 1, line 53, "10%-222%-15%" should be -- 10%-22% --

Signed and sealed this 21st day of March 1972.

(SEAL)
Attest:

EDWARD M. FLETCHER, JR.          ROBERT GOTTSCHALK
Attesting Officer                Commissioner of Patents